UNITED STATES PATENT OFFICE.

FREDERICK SALATHÉ, OF JERSEY CITY, NEW JERSEY, ASSIGNOR, BY MESNE ASSIGNMENTS, TO THE LITHO-CARBON COMPANY, OF NEW YORK, N. Y.

IMPERVIOUS TISSUE.

SPECIFICATION forming part of Letters Patent No. 452,762, dated May 19, 1891.

Application filed November 12, 1890. Serial No. 371,129. (No specimens.)

*To all whom it may concern:*

Be it known that I, FREDERICK SALATHÉ, a citizen of the United States, residing at Jersey City, in the county of Hudson and State of New Jersey, have invented a new and useful Improvement in Impervious Tissues, of which the following is a specification.

This invention comprises a novel elastic self-supporting tissue practically impervious to water and to the ordinary chemical agencies, capable of use for various industrial purposes—as, for example, in the production of water-proof fabrics for mackintoshes and other articles of clothing. It is based upon the peculiar properties of a new product, which enables the said product to combine with india-rubber, gutta-percha, and oxidized linseed-oil (these three last-named substances for the purposes of my invention being the equivalents of each other) to form a material capable of being formed into extremely thin sheets practically water-proof and sufficiently strong to more than sustain their weight when suspended without support and with a surface sufficiently adhesive to permit of its attachment to either surface—for example, the surfaces of woven fabrics—by simple pressure, either with or without heat, according to the circumstances of the case, and without the necessity of any special cementing material. By reason of its tenacity, strength, adhesiveness, and water-proof character, combined with the property in a high degree of resisting acids and alkalies in their ordinary diluted or combined conditions, the said novel tissue is exceptionally adapted to many useful and industrial purposes.

The new product, which is the essentially novel ingredient of the material or composition of matter herein claimed, is a hydrocarbon product of my own invention.

The nature and properties of this hydrocarbon product, as well as the process by which it is obtained, are fully set forth and claimed by me in my application for Letters Patent filed March 16, 1891, bearing Serial No. 383,942, on which Letters Patent issue of even date herewith, and to which reference is hereby made for more complete information. It is sufficient here to say that the said hydrocarbon product is a resinoid hydrocarbon of the $C_{10}H_{16}$ series, which has substantially the following analysis: carbon, 88.23; hydrogen, 11.59; oxygen, .06; sulphur, trace, the same being a solid material with a specific gravity of from 1.000 to 1.028, tough and of a glossy jet-black color, flexible and somewhat plastic at ordinary temperatures, soluble in naphtha, benzole, chloroform, bisulphide of carbon, partially in ether, completely in turpentine, rosin-oils, &c., capable of withstanding a temperature of 600° Fahrenheit, and resisting alkalies and acids, excepting concentrated nitric and concentrated sulphuric acids. It is obtained from a natural substance, which, so far as I am at present informed, is found in the State of Texas only, but which, possibly, may exist in other localities, the treatment which I employ for obtaining this product consisting, essentially, in first separating the crude natural substance from the sand or shell rock in which it is found in nature by means of a solvent, then separating or driving off the solvent from the crude material thus obtained, and finally injecting steam or hot air into the said crude material in order to drive off the sulphur and volatile-oil constituents which are combined therewith, as well as to supply the said material with the oxygen, which is lacking in the natural substance, all as more fully set forth in my aforesaid application, Serial No. 383,942.

In carrying out my present invention the said hydrocarbon product is combined with any desired quantity of india-rubber, gutta-percha, or oxidized linseed-oil (said three substances last named being, as hereinbefore stated, for the purposes of my said invention the equivalents of each other) in proportions of from, say, five to fifty per cent. of the entire mass. The hydrocarbon product is amalgamated with the india-rubber or either one of its named equivalents by being passed therewith through machinery, such as is employed in the treatment of india-rubber to render it homogeneous. This is a mechanical amalgamation. Any other suitable means of combining the materials may be employed. Thus an amalgamation of the materials may be effected by melting the hydrocarbon product and in its molten condition adding to and dissolving in the same the desired or requisite quantity of the india-rubber, gutta-percha, or oxidized linseed-oil, as the case may be; or the hydrocarbon product and the india-rubber (or its named equivalent) may be separately dissolved in some solvent common to both, and the two solutions being united the solvent may be subsequently evaporated or otherwise removed.

The proportions of the materials may vary within wide limits. Good results are obtained with from eighty to eighty-five parts of the hydrocarbon product, combined with from fifteen to twenty parts of the india-rubber or one of the other of its named equivalents. By varying the proportions tissues of varying strength and elasticity may be made. The mass resulting from the incorporating or mixing of the substances named is passed in its solid condition between calender-rolls, which should be kept moistened with water to prevent any adhesion thereto of the material. The friction and pressure to which the mass of material is subjected during this operation give it sufficient plasticity to enable it to be formed into thin sheets by the action of the said rolls and these sheets constitute the tissues.

As calender-rolls and their adjuncts for forming plastic materials into thin sheets are well known, a special description or illustration of mechanism employed in the production of said improved tissue comprised by my said invention is deemed unnecessary here.

This improved tissue possessing the characteristics hereinbefore set forth is capable of many industrial uses, among others for uniting two fabrics with said tissues between them; also for permanent application to one side of a fabric, and for corresponding permanent application between two sheets of paper or to one surface of a sheet of the latter. These applications may be effected by placing the tissue between or upon, as the case may be, the surface or surfaces to which it is to be united and subjecting the whole to the action of rollers heated to a degree sufficient to provide a surface adhesiveness to the tissue. A moderate adhesion of the tissue may be obtained, however, by simple pressure at ordinary temperature; but a better result is obtained when the pressure-rolls have a temperature of, say, 110° Fahrenheit.

What I claim as my invention is—

The water-proof tissue composed of the within-described hydrocarbon product, combined with india-rubber or one or more of its named equivalents, substantially as set forth.

FREDERICK SALATHÉ.

Witnesses:
CHARLES TAYLOR,
JOHN C. DICKINSON.

It is hereby certified that the assignee, "The Litho-Carbon Company," in Letters Patent No. 452,762, granted May 19, 1891, upon the application of Frederick Salathé, of Jersey City, New Jersey, for an improvement in "Impervious Tissues," should have been described and specified as *The Litho-Carbon Company, a corporation of the State of New Jersey*, instead of "The Litho-Carbon Company, of New York, N. Y.;" and that the said Letters Patent should be read with this correction therein that the same may conform to the record of the case in the Patent Office.

Signed, countersigned, and sealed this 16th day of June, A. D. 1891.

[SEAL.]

CYRUS BUSSEY,
*Assistant Secretary of the Interior.*

Countersigned:
   C. E. MITCHELL,
      *Commissioner of Patents.*